(12) United States Patent
Lengsfeld

(10) Patent No.: US 8,097,104 B2
(45) Date of Patent: Jan. 17, 2012

(54) TAPE INSTALLATION DEVICE AND METHOD FOR THE CONSTRUCTION OF A LAMINATE

(75) Inventor: Hauke Lengsfeld, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/988,677

(22) PCT Filed: Mar. 12, 2009

(86) PCT No.: PCT/EP2009/052928
§ 371 (c)(1),
(2), (4) Date: Jan. 6, 2011

(87) PCT Pub. No.: WO2009/130087
PCT Pub. Date: Oct. 29, 2009

(65) Prior Publication Data
US 2011/0108188 A1    May 12, 2011

Related U.S. Application Data

(60) Provisional application No. 61/125,292, filed on Apr. 24, 2008.

(30) Foreign Application Priority Data

Apr. 24, 2008  (DE) .......................... 10 2008 020 564

(51) Int. Cl.
*B32B 37/00* (2006.01)
(52) U.S. Cl. .................. 156/73.1; 156/580.1; 156/580.2
(58) Field of Classification Search .................. 156/73.1, 156/308.2, 309.6, 324, 580.1, 580.2
See application file for complete search history.

(56) References Cited

U.S. PATENT DOCUMENTS
5,039,371 A * 8/1991 Cremens et al. .............. 156/382
(Continued)

FOREIGN PATENT DOCUMENTS
DE           40 04 720 A1    8/1991
(Continued)

OTHER PUBLICATIONS

M. Ahrens, V. Mallick, K. Parfrey, "Robotic Based Thermoplastic Fibre Placement Process", *Proceedings of the 1998 IEEE, International Conference on Robotics & Automation*, Leuven, Belgium, May 1998, pp. 1148-1153.
(Continued)

*Primary Examiner* — James Sells
(74) *Attorney, Agent, or Firm* — Greer, Burns & Crain, Ltd.

(57) ABSTRACT

The present invention creates a tape laying device as well as a method for the construction of a laminate by means of a tape laying device, in particular in the field of aviation and aerospace. The tape laying device comprises a laying arrangement for laying tape for the construction of a laminate and a stimulation arrangement by means of which the tape which has to be laid can be stimulated directly and evenly over the thickness thereof so as to be heated. The idea the present invention is based on consists in that instead of the stimulation at the surface of the tape which has to be laid which is known to the Applicant a direct and evenly stimulation of the tape which has to be laid takes place, that means, a stimulation which acts substantially direct and evenly over the thickness of the tape which has to be laid on the tapes components. The heating achieved by this is much faster than by means of convection according to the known approach. Therefore, the desired tackiness of the tape which has to be laid can be achieved at the desired high laying velocity.

9 Claims, 3 Drawing Sheets

U.S. PATENT DOCUMENTS

| | | | |
|---|---|---|---|
| 5,228,944 A * | 7/1993 | Seifried et al. | 156/500 |
| 6,432,236 B1 | 8/2002 | Leemon et al. | |
| 6,511,563 B2 * | 1/2003 | Roylance et al. | 156/73.1 |
| 2005/0023728 A1 | 2/2005 | Benson et al. | |

FOREIGN PATENT DOCUMENTS

DE  10 2007 009 124 A1  8/2008

OTHER PUBLICATIONS

S.M. Grove, "Thermal Modelling of Tape Laying with Continuous Carbon Fibre-Reinforced Thermoplastic", *Composites*, vol. 19, No. 5, Sep. 1988, pp. 367-375.

Examination Report of German Priority Application No. 10 2008 020 564.8, Dec. 2008.

* cited by examiner (A)

(B - B)

TAPE INSTALLATION DEVICE AND METHOD FOR THE CONSTRUCTION OF A LAMINATE

CROSS-REFERENCE TO RELATED APPLICATIONS

This application claims the benefit of U.S. Provisional Application No. 61/125,292, filed Apr. 24, 2008 and German Patent Application No. 10 2008 020 564.8, filed Apr. 24, 2008, the entire disclosures of which are herein incorporated by reference.

FIELD OF THE INVENTION

The present invention relates to a tape laying device, in particular in the field of aviation and aerospace, and to a method for the construction of a laminate using a tape laying device.

Automatic tape laying devices are currently frequently used for processing tapes, and are capable of laying tape over a large area. During the laying process, tape to be laid is pressed onto previously laid tape using relatively low pressure, using either a sliding block or a pressure roller depending on the type of tape laying device used, in such a way that the tape to be laid adheres slightly to the previously laid tape. However, this process requires suitable adhesiveness of the matrix system in the tape to be laid or in the laid tape. This adhesiveness can be increased by moderate heating. In the Applicant's business, it has therefore become conventional to guide a warm airstream past the tape to be laid, which airstream heats the tape to be laid by convection.

However, it has been found that the aforementioned heating by means of the warm airstream only takes place very slowly, since the tape to be laid is only stimulated for the purpose of heating on the surface thereof, and therefore the desired laying speeds cannot be achieved.

SUMMARY OF THE INVENTION

It is therefore an object of the present invention to provide an improved tape laying device and an improved method for the construction of a laminate using a tape laying device which overcome the aforementioned disadvantages.

This object is achieved according to the invention by a tape laying device with the features of claim 1 and/or by a method with the features of claim 8.

Accordingly, a tape laying device, in particular in the field of aviation and aerospace, is provided with a laying arrangement and a stimulation arrangement. The laying arrangement is configured so as to be suitable for laying tape to construct a laminate. The tape to be laid can be stimulated directly and evenly over the thickness thereof by the stimulation arrangement so as to be heated.

A method for the construction of a laminate using a tape laying device, in particular in the field of aviation and aerospace, having the following steps is further provided. Initially, a tape to be laid is supplied to a laying arrangement. Subsequently, the tape to be laid is stimulated directly and evenly over the thickness thereof by the stimulation arrangement so as to be heated. Next, the tape to be laid is laid by the laying arrangement to construct the laminate.

The idea on which the present invention is based involves providing stimulation throughout the tape to be laid, i.e. stimulation which acts on the components of the tape to be laid substantially directly and evenly over the thickness of said tape, instead of the stimulation known to the Applicant on the surface of the tape to be laid. The heating achieved in this manner takes place considerably faster than that on the surface according to the known approach. Consequently, the desired adhesiveness of the tape to be laid can be achieved at the desired high laying speed.

Advantageous developments and improvements of the invention are provided in the subclaims.

In the present case, a "tape" preferably means any type of web-shaped prepreg material, for example 300 mm wide prepreg strip material, which is suitable for laying using a tape laying device. In the present case, "prepreg material" means rovings, fibre-woven fabric and/or fibrous tissues which are impregnated, in particular preimpregnated, with a matrix, for example a thermosetting matrix or thermoplastic matrix. The fibres of the fibre-woven fabric or fibrous tissues are in particular carbon fibres. The tape is preferably arranged on a base material, in particular a base paper. As the tape is laid to construct the laminate, the base material preferably separates from the tape, the base material being wound up using a suitable means of the tape laying device.

In the present case, a "tape laying device" preferably also includes a fibre placement device.

According to a preferred development of the tape laying device according to the invention, the laying arrangement comprises a pressure roller with which the tape to be laid can be pressed onto laid tape and/or onto a laminating device, the stimulation arrangement being integrated into the pressure roller. The stimulation arrangement is thus formed inside the pressure roller and/or as a component thereof. This results in a very compact construction. Alternatively, the stimulation arrangement may also be integrated into a pressure sliding block. The stimulation arrangement integrated into the pressure roller may of course also be used to stimulate and thus warm previously laid tape simultaneously with the tape to be laid. A relatively wide-range stimulation arrangement in the form of an induction arrangement would be particularly suitable for this purpose.

According to a further preferred development of the tape laying device according to the invention, the stimulation arrangement comprises a plurality of stimulation units, which are arranged distributed along the circumference of the pressure roller and which can be wired in such a way that, as the pressure roller rotates, only the stimulation units which are arranged in the region of the circumference of the pressure roller associated with the tape to be laid are switched on. The stimulation arrangement can thus be operated very efficiently, since only the stimulation units which are arranged substantially in the direct vicinity of the tape to be laid, and are thus able to stimulate the tape to be laid substantially without losses, are switched on so as to stimulate the tape to be laid.

According to a further preferred development of the tape laying device according to the invention, the laying arrangement comprises a pressure roller with which the tape to be laid can be pressed onto laid tape and/or onto a laminating device, the stimulation arrangement and the pressure roller forming a gap through which the tape to be laid can be guided so as to be stimulated. This stimulation arrangement may be provided instead of or in addition to the stimulation arrangement integrated into the pressure roller. This last option would have the advantage that the tape to be laid could be stimulated from both sides. The arrangement of the stimulation arrangement outside the pressure roller has the advantage that said stimulation arrangement can be provided stationary relative to the pressure roller and relative to the tape to be laid, and this results in a relatively simple construction.

According to a further preferred development of the tape laying device according to the invention, a further stimulation arrangement is provided with which laid tape can be stimulated directly and evenly over the thickness thereof so as to be heated. This is intended to apply in particular to heating an uppermost layer of a plurality of layers of laid tape. To improve even further the adhesion of the tape to be laid to previously laid tape, the previously laid tape should be stimulated and thus heated as well as the tape to be laid. In this way, both the tape to be laid and the previously laid tape have a high adhesiveness. If these are subsequently pressed together, for example using the pressure roller, this results in very good adhesion of the tape to be laid and the previously laid tape.

According to a further preferred development of the tape laying device, the further stimulation arrangement is arranged behind the pressure roller, as seen in the displacement direction thereof, to stimulate the laid tape. In this way, it can be ensured in a simple manner that the previously laid tape is stimulated and thus heated before it comes into contact with the tape to be laid.

According to a further preferred development of the tape laying device according to the invention, the further stimulation arrangement is integrated into a sliding block or a roller. A sliding block or roller of this type can be guided in a simple manner over the previously laid tape, and this basically makes direct contact possible between the further stimulation arrangement and the previously laid tape, and this in turn makes a high introduction of energy (stimulation) possible per unit time.

According to a further preferred development, the stimulation arrangement may be arranged inside the pressure roller but not rotate therewith. This is expedient in particular in the case where the stimulation arrangement is in the form of an induction arrangement. The induction arrangement should be oriented towards the portion of the tape which is substantially in contact with the pressure roller and/or is located behind the roller as seen in the displacement direction.

According to a further preferred development of the tape laying device according to the invention, the tape to be laid and/or the laid tape is stimulated without contact. This makes it possible to prevent the stimulation arrangement or the further stimulation arrangement from being soiled by the matrix in the tape. If possible, however, a minimum gap should be provided between the tape to be laid or laid tape and the stimulation arrangement and further stimulation arrangement, so as to maximise the energy introduced per unit time.

According to a further preferred development of the tape laying device according to the invention, the stimulation arrangement and/or the further stimulation arrangement is in the form of an ultrasound arrangement and/or an induction arrangement. These make a direct and even stimulation of the tape possible over the thickness thereof. Special deep-action infrared radiators are also a possibility for an application of this type.

According to a further preferred development of the method according to the invention, the tape to be laid is laid on laid tape or a laminating device. The resulting advantages have already been described in the above.

According to a further preferred development of the method according to the invention, before laying the tape to be laid, the laid tape is stimulated directly and evenly over the thickness thereof for heating purposes with a further stimulation arrangement. Again, the resulting advantages have already been described in the above.

According to a further preferred development of the method according to the invention, the tape to be laid and/or laid tape is stimulated by ultrasound and/or using a variable magnetic field. Once again, the resulting advantages have already been described in the above.

In the following, the invention is described in detail by way of embodiments with reference to the appended figures of the drawings.

BRIEF DESCRIPTION OF THE DRAWINGS

In the figures:

In the figures, like or functionally equivalent components are denoted by like reference numerals, unless stated otherwise.

FIG. 1 is a side view of a tape laying device 1 according to a preferred embodiment of the present invention.

DESCRIPTION OF EXEMPLARY EMBODIMENTS

Figure 1:
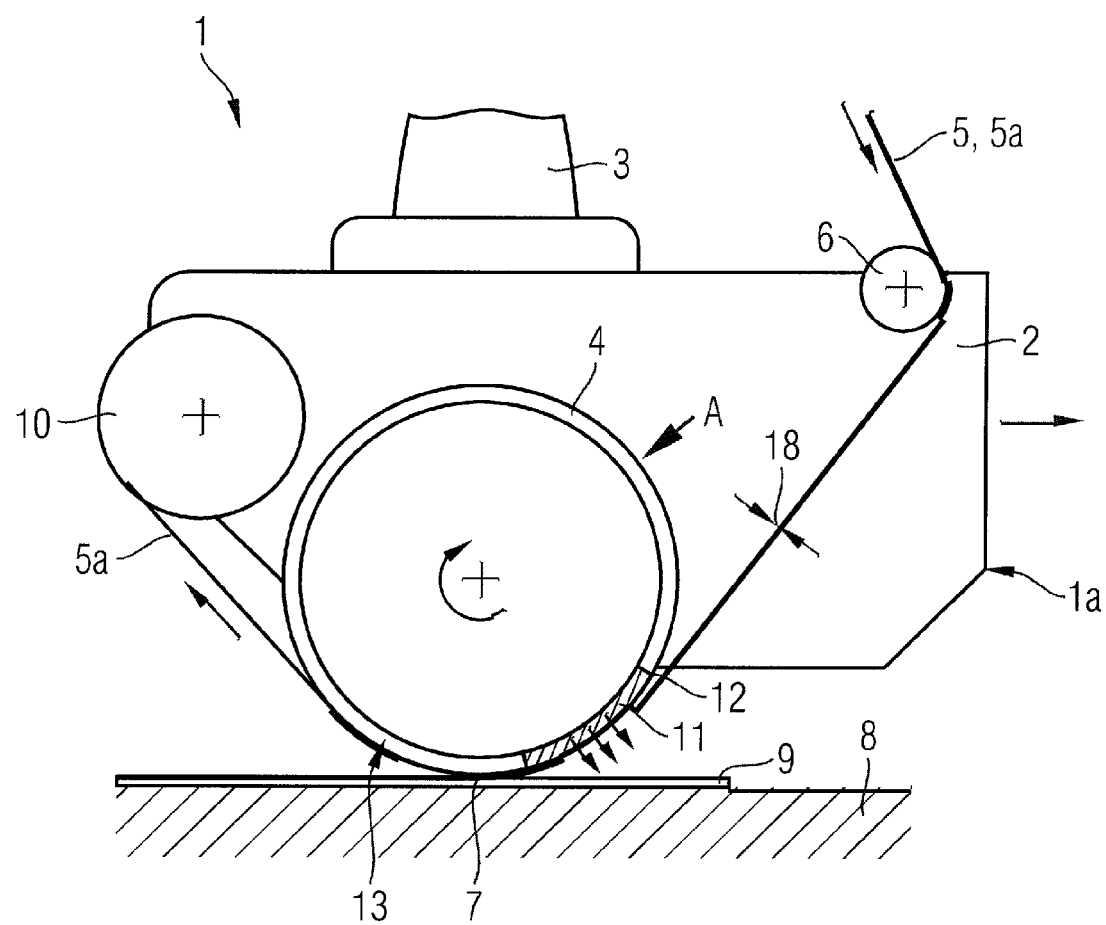
FIG. 1 is a side view of a tape laying device according to a preferred embodiment of the invention.

The tape laying device 1 comprises a laying arrangement 1a having a holder 2 which is for example fastened to a flange 3 of a gantry robot (not shown). The gantry robot displaces the tape laying device 1 in the displacement direction indicated by the arrow 3a.

A pressure roller 4 of the laying arrangement 1a is provided mounted rotatably on the holder 2, to which pressure roller tape 5 on a base paper 5a from a reel (not shown) is supplied thereto at the front side via a deflection roller 6, which is also provided mounted rotatably on the holder 2.

The tape 5 having the base paper 5a wraps around the pressure roller 4 in portions, the base paper 5a being arranged between the tape 5 and the pressure roller 4. The tape 5 is pressed onto a laminate 9, which is already constructed on a laminating device 8, in a region 7 by means of the pressure roller 4. This causes the tape 5 to adhere to the laminate 9 and to separate from the base paper 5a as a result of the displacement of the tape laying device 1 in the displacement direction 3a.

The laminate 9 is composed of one or more layers of the tape 5. These layers are constructed by the laminating device 1 in steps, which start from the method state shown in FIG. 1.

The base paper 5a is wound onto a roller 10 on the rear side of the pressure roller 4.

The direction of rotation of the pressure roller 4 and the conveyance direction of the tape 5 and the support paper 5a is shown in FIG. 1 with arrows in each case by way of example.

So as to ensure improved adhesion of the tape 5 to the laminate 9, it is provided that the laminate 5 is stimulated for heating at least in a region 11. The region 11 preferably extends from the region 7 along the circumference of the pressure roller 4 to a region 12, in which the tape 5 first comes into contact with the pressure roller 4. According to the embodiment of FIG. 1, the stimulation of the tape 5 in the region 11 is effected by a stimulation arrangement 13 of the tape laying device 1, which is shown purely schematically in FIG. 1.

Figure 2:
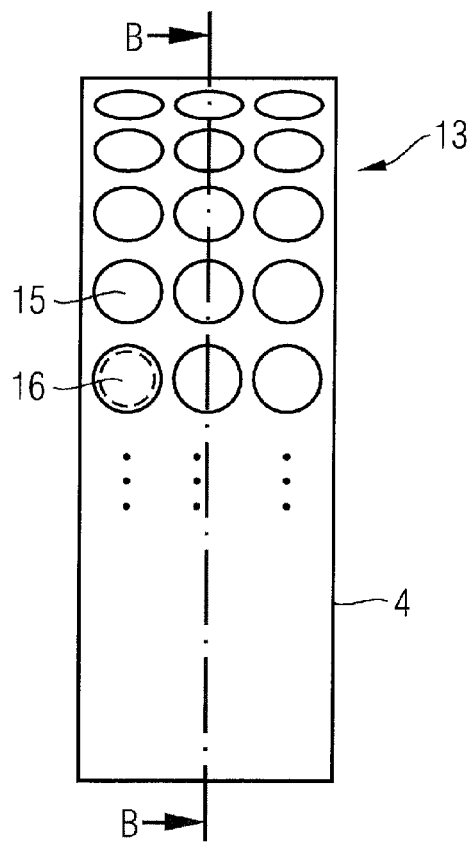
FIG. 2 is a schematic view A of a pressure roller of the tape laying device of FIG. 1.
Figure 3:
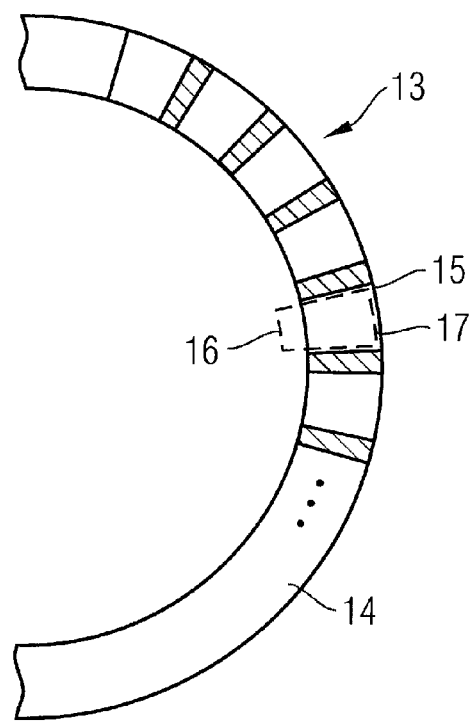
FIG. 3 is a schematic sectional view along line B-B of FIG. 2.

FIG. 2 is a schematic view A of the pressure roller of FIG. 1. FIG. 3 is a sectional view along line B-B of FIG. 2.

As is shown in FIG. 2, the pressure roller 4 comprises in the substantially annular wall 14 thereof a plurality of radially extending recesses (denoted by way of example by reference numeral 15). A stimulation unit 16, for example a sonotrode, is arranged in each of these recesses 15. In FIGS. 2 and 3, only one sonotrode 16 is shown by way of example.

In the region 11 (see FIG. 1), the stimulation heads 17 of the sonotrodes 16 come into contact with the base paper 5A or form a minimum gap therewith. The sonotrodes 16 are controlled by a control means (not shown) in such a way that only the sonotrodes 16 which are currently arranged in the region 11 (see FIG. 1) are switched on to stimulate the tape 5. The ultrasound produced by the sonotrodes 16, which is for example in a frequency range between 20 kHz and 5 MHz, causes heating of the tape 5. This heating is provided over the entire thickness, denoted by reference numeral 18 in FIG. 1, of the tape 5 within an extremely short time. This considerably increases the adhesiveness of the tape 5, which consequently adheres well to the laminate 9 in the region 7 (see FIG. 1).

Figure 4:
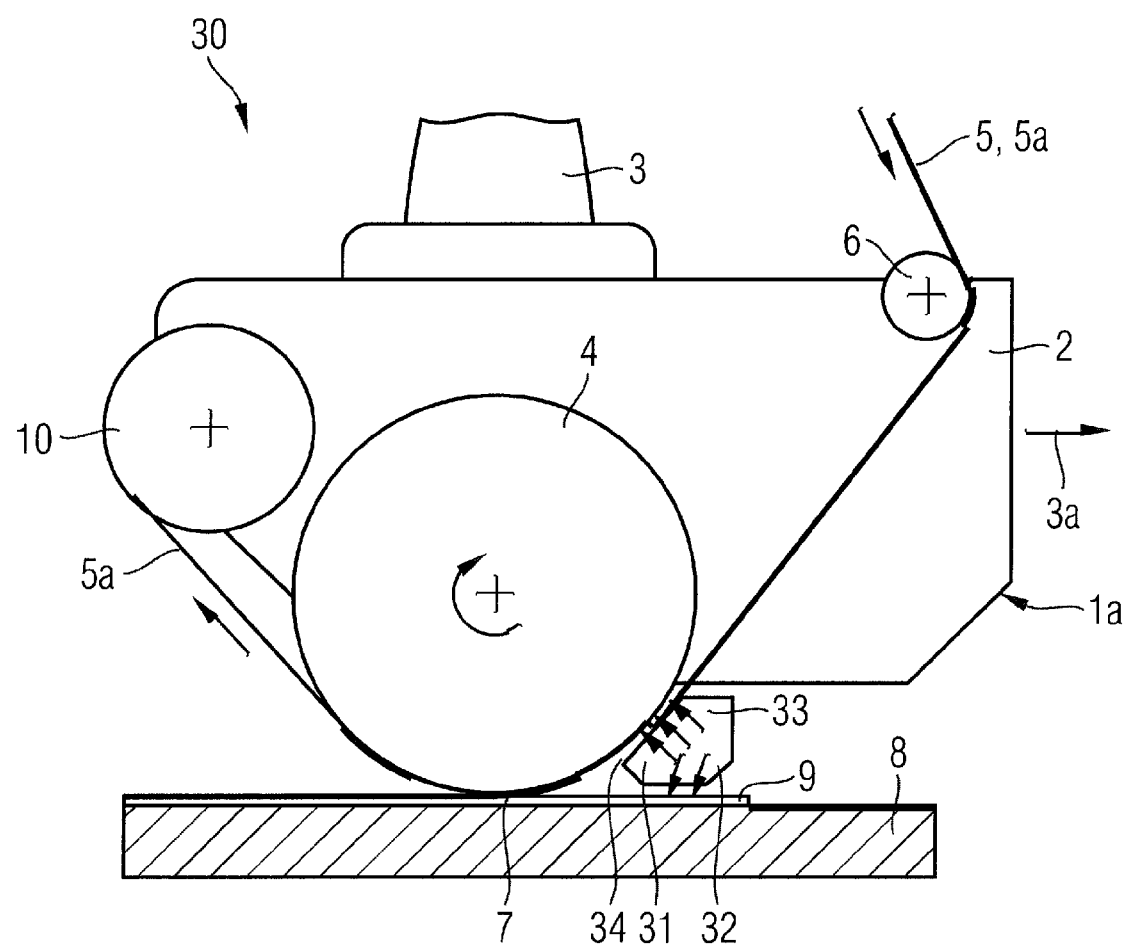
FIG. 4 is a side view of a tape laying device according to a further preferred embodiment of the invention.

FIG. 4 is a schematic side view of a tape laying device 30 according to a further preferred embodiment of the invention. The following will only discuss the differences between the tape laying device 30 according to FIG. 4 and the tape laying device 1 of FIG. 1.

A first stimulation arrangement 31 and a second stimulation arrangement 32 are provided in the tape laying device 30.

The first stimulation arrangement 31 corresponds in function to the stimulation arrangement 13, but is arranged inside a sliding block 33, outside the pressure roller 4 and behind this as seen in the displacement direction 3a. The sliding block 33 and the pressure roller 4 form a gap 34 through which the tape 5 is guided along with the base paper 5A.

The second stimulation arrangement 32 is preferably also integrated into the sliding block 33. The second stimulation arrangement 32 basically stimulates an uppermost tape layer of the previously laid laminate 9 directly and evenly over the thickness thereof so as to heat said laminate. In this way the adhesiveness of the previously laid laminate 9 can also be increased, and as a result the adhesion of the tape 5 to be laid to the laminate 9 in the region 7 can be even further improved.

In FIGS. 1 and 4, the direction of the stimulation of the respective stimulation arrangement 13 or 31 and 32 is shown by a plurality of arrows.

The first and second stimulation arrangement 31, 32 may for example be in the form of induction arrangements which generate a variable magnetic field, leading in turn to current flow within the fibres, in particular carbon fibres, in the tape. The inherent electric resistance of the fibres in turn leads to the tape 5 or the laminate 9 being heated.

Naturally, the embodiments according to FIGS. 1 and 4 may be combined.

The stimulation units 16 in the embodiment according to FIG. 1 could also be formed as induction units.

Although the present invention has been described by way of preferred embodiments, it is not limited thereto, but can be modified in various ways.

In addition, it should be noted that "a" does not rule out a plurality. It should further be noted that features or steps which have been described in reference to one embodiment may also be used in combination with other features or steps of other embodiments or developments.

The present invention provides a tape laying device and a method for the construction of a laminate using a tape laying device, in particular in the field of aviation and aerospace. The tape laying device comprises a laying arrangement for laying tape for the construction of a laminate and a stimulation arrangement with which the tape to be laid can be stimulated so as to be heated directly and evenly over the thickness thereof. The idea on which the present invention is based involves providing stimulation of the tape to be laid directly and evenly over the thickness thereof, i.e. stimulation which acts on the components of the tape to be laid substantially directly and evenly over the thickness of said tape, instead of the stimulation known to the Applicant on the surface of the tape to be laid. The heating achieved in this manner takes place considerably faster than that by convection according to the known approach. Consequently, the desired adhesiveness of the tape to be laid can be achieved at the desired high laying speed.

LIST OF REFERENCE NUMERALS 1 tape laying device
1a laying arrangement
2 holder
3 flange
3a displacement direction
4 pressure roller
5 tape
5a base paper
6 deflection roller
7 region
8 laminating device
9 laminate
10 roller
11 region
12 tape
13 stimulation arrangement
14 wall
15 recess
16 sonotrode
17 stimulation head
18 thickness
30 tape laying device
31 stimulation arrangement
32 stimulation arrangement
33 sliding block
34 gap

The invention claimed is:

1. A tape laying device, in particular in the field of aviation and aerospace, comprising:
   a laying arrangement for laying tape for the construction of a laminate, the laying arrangement comprising a pressure roller with which the tape to be laid can be pressed onto laid tape; and
   a stimulation arrangement, in the form of an ultrasound arrangement, with which the tape to be laid can be stimulated directly and evenly over the thickness thereof so as to be heated, the stimulation arrangement being integrated into the pressure roller and the stimulation arrangement comprising a plurality of stimulation units which are arranged distributed along the circumference of the pressure roller.

2. The tape laying device according to claim 1, wherein the plurality of stimulation units can be wired in such a way that, as the pressure roller rotates, only the stimulation units which are arranged in the region of the circumference of the pressure roller associated with the tape to be laid are switched on.

3. The tape laying device according to claim 1, wherein the laying arrangement comprises a pressure roller, with which the tape to be laid can be pressed onto laid tape, the stimulation arrangement and the pressure roller forming a gap through which the tape to be laid can be guided so as to be stimulated.

4. The tape laying device according to claim 1, wherein a further stimulation arrangement is provided with which laid tape can be stimulated directly and evenly over the thickness thereof so as to be heated.

5. The tape laying device according to claim 4, wherein the further stimulation arrangement is arranged behind the pressure roller, as seen in the displacement direction thereof, to stimulate the laid tape.

6. The tape laying device according to claim 4, wherein the further stimulation arrangement is integrated into a sliding block or a roller.

7. The tape laying device according to claim 1, wherein the tape to be laid and/or the laid tape is stimulated without contact.

8. A method for the construction of a laminate using a tape laying device, in particular in the field of aviation and aerospace, comprising the following steps:

supplying tape to be laid to a laying arrangement, the laying arrangement comprising a pressure roller;

direct and even stimulation of the tape to be laid over the thickness thereof using a stimulation arrangement in the form of an ultrasound arrangement, the stimulation arrangement being integrated into the pressure roller and the stimulation arrangement comprising a plurality of stimulation units which are arranged distributed along the circumference of the pressure roller; and laying the tape to be laid to construct the laminate using the laying arrangement.

9. The method according to claim 8, wherein the tape to be laid is laid on laid tape, the laid tape being stimulated directly and evenly over the thickness thereof for heating purposes with a further stimulation arrangement before laying the tape to be laid.

* * * * *